No. 674,131. Patented May 14, 1901.
H. M. BARNGROVER.
FRUIT PRICKING MACHINE.
(Application filed Jan. 11, 1901.)

(No Model.)

Witnesses.
F. E. Monteverde
Walter F. Vane

Inventor.
Harvey M. Barngrover
by Wm. F. Booth
his Attorney.

THE NORRIS PETERS CO., PHOTO-LITHO., WASHINGTON, D. C.

UNITED STATES PATENT OFFICE.

HARVEY M. BARNGROVER, OF LOS GATOS, CALIFORNIA.

FRUIT-PRICKING MACHINE.

SPECIFICATION forming part of Letters Patent No. 674,131, dated May 14, 1901.

Application filed January 11, 1901. Serial No. 42,834. (No model.)

*To all whom it may concern:*

Be it known that I, HARVEY M. BARNGROVER, a citizen of the United States, residing at Los Gatos, Santa Clara county, State of California, have invented certain new and useful Improvements in Fruit-Pricking Machines; and I do hereby declare the following to be a full, clear, and exact description of the same.

My invention relates to that class of machines for pricking or puncturing the skins of fruit, like prunes and plums, preparatory to drying, in which the fruit is subjected to the action of pricking-needles whereby the skin is punctured.

The object of my invention is to insure certainty in the operation by providing a machine capable of adapting itself, both by reason of its essential structure and the adjustments of its parts, to all the conditions of the work, as I shall hereinafter more fully explain.

My invention consists, primarily, of a rotatable pricking-cylinder in connection with a partially-encircling yielding pressure-apron located with relation to the cylinder in such manner as to leave a space between them for the passage of the fruit.

It also consists in means, in connection with said apron, of regulating its pressure on the fruit and in details of construction and arrangement, which I shall fully describe.

Figure 1:
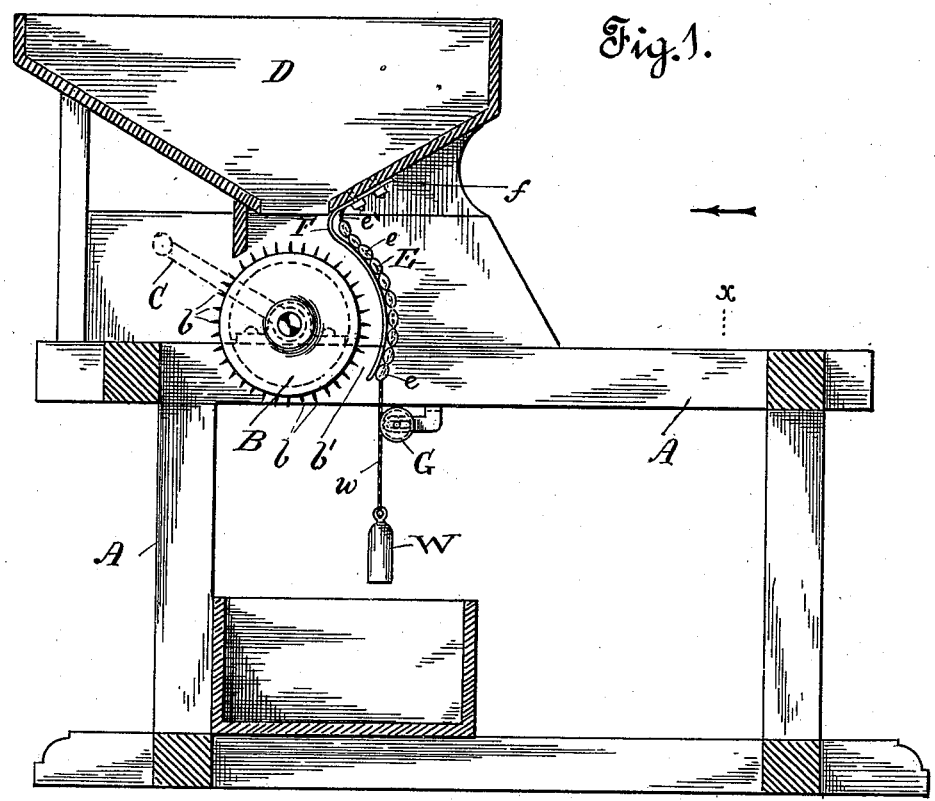
Figure 2:
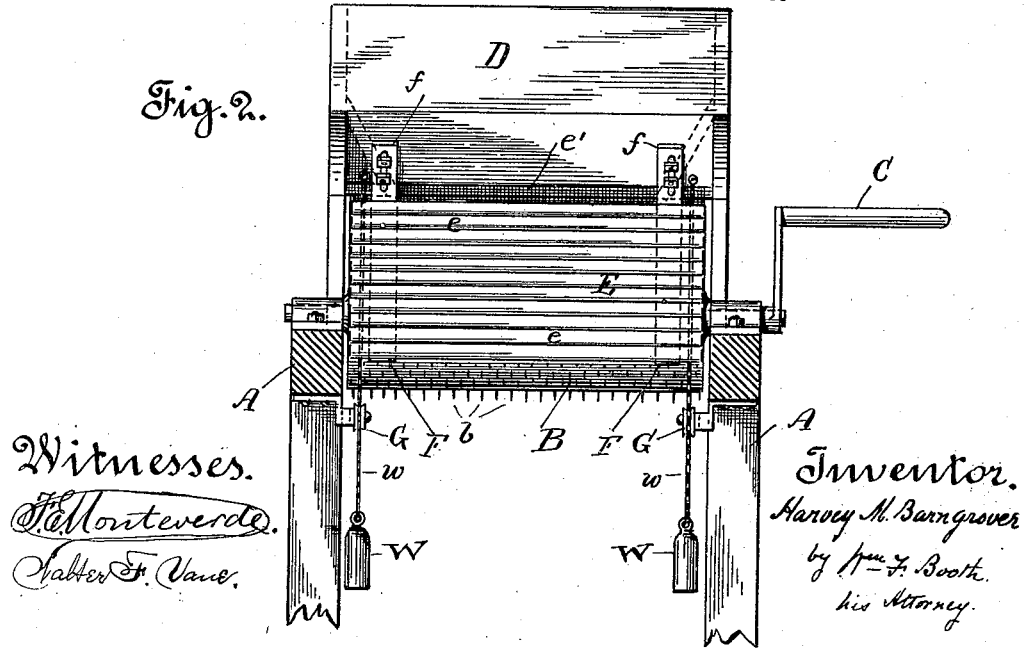

Referring to the accompanying drawings, Figure 1 is a sectional side elevation of my machine. Fig. 2 is a front view of same looking from the apron side.

A is a frame or stand, in which is mounted a cylinder B, having upon its periphery the needles $b$, thereby constituting it a pricking-cylinder. A rotary motion is imparted to the pricking-cylinder by any suitable means. A hand-crank C is here shown for the sake of illustration.

D is a hopper in position to feed the fruit to the pricking-cylinder.

E is a pressure-apron. It partially encircles the cylinder, being separated from it to leave an intervening space $b'$. Into this space, at the upper end, the fruit passes from the hopper, and from the lower end of the space the fruit is discharged. The pressure-apron is a yielding one—that is to say, it is adapted to give under the pressure of the fruit in its passage. This yielding may be the result of the manner of mounting or connecting it, as by a joint at its upper end; but the best construction is to make the apron itself flexible, so that its yielding pressure will be exercised at all points throughout its length. This flexibility may be had in various ways, depending upon the material used and the construction of the apron. For illustration I have here shown the apron as formed of juxtaposited parallel slats $e$, connected by a flexible material $e'$, such as canvas or other fabric. Guides or supports F hold the apron in proper position and define the minimum width of the space $b'$, through which the fruit passes. The apron merely lies upon these supports and is free to move outwardly therefrom. The degree of pressure exercised by the apron E is regulated by the weights W, suspended from its lower end. These weights serve to hold the apron against the pressure of the passing fruit, and by increasing or diminishing said weights the apron may be held with any predetermined force. Small pulleys G guide the weight-suspending ropes $w$. These pulleys are made adjustable, as shown, so that by setting them nearer to or farther from the plane of the cylinder the effective or working length of the apron may be varied by allowing more or less of its length to lie in normal position against the guides or supports F. Also by providing for the adjustment of the guides or supports F nearer to or farther from the cylinder the minimum width of the feed-space $b'$ may be initially determined. For this purpose I have here shown the upper ends $f$ of the guides as being adjustably connected to their support.

The operation is as follows: The fruit is supplied to the hopper D, by which it is fed to the pricking-cylinder. By the rotation of the cylinder the fruit is carried into the space $b'$, wherein, being opposed by the pressure-apron E, it is punctured or pricked by the cylinder-needles. During its course each specimen is rolled and turned many times, always finding sufficient resistance in the apron to cause it to be pricked over and over again and finding also sufficient give or yield in the apron to enable it to free itself from the needles without being torn, and thus to be ready for fresh punctures. The flexibility of the apron enables it to lie close to all grades of the fruit, thus rendering it possible to feed the fruit to the machine without a preliminary grading, leaving this to be done subsequently. The fruit finally falls from the lower end of space b' properly pricked and is received in or upon a suitable receptacle. In this operation the pricking is positive and certain, the possible adjustments being such as to prevent such a hasty or voluminous supply of fruit as would result in the escape of many individuals from the action of the needles; nor is there any liability of undue or excessive action, resulting in tearing the skins, for the adjustment of the pressure of the apron may be so made as to nicely regulate the conditions for all grades of fruit, and the yielding of the apron at any point due to its inherent flexibility will prevent undue pressure on any one grade.

Having thus described my invention, what I claim as new, and desire to secure by Letters Patent, is—

1. In a fruit-pricking machine, the combination of a rotatable pricking-cylinder, and a yielding pressure-apron, partially encircling said cylinder, and separated therefrom, to leave an intervening space for the passage of the fruit.

2. In a fruit-pricking machine, the combination of a rotatable pricking-cylinder, and a pressure-apron of a flexible character, partially encircling said cylinder, and separated therefrom, to leave an intervening space for the passage of the fruit.

3. In a fruit-pricking machine, the combination of a rotatable pricking-cylinder, a yielding pressure-apron, partially encircling said cylinder, and separated therefrom, to leave an intervening space for the passage of the fruit, and supports for said apron, adapted to determine the minimum width of said space.

4. In a fruit-pricking machine, the combination of a rotatable pricking-cylinder, a yielding pressure-apron, partially encircling said cylinder, and separated therefrom, to leave an intervening space for the passage of the fruit, and adjustable supports for said apron, adapted to regulate the minimum width of said space.

5. In a fruit-pricking machine, the combination of a rotatable pricking-cylinder, a yielding pressure-apron partially encircling said cylinder, and separated therefrom, to leave an intervening space for the passage of the fruit, and supports upon which the pressure-apron freely lies, and which determine the minimum width of the space between the apron and cylinder.

6. In a fruit-pricking machine, the combination of a rotatable pricking-cylinder, a yielding pressure-apron partially encircling said cylinder, and separated therefrom, to leave an intervening space for the passage of the fruit, and supports adjustable toward and away from the cylinder, upon which said supports the pressure-apron freely lies, and which, by their adjustment, are adapted to regulate the minimum width of the space between the apron and cylinder.

7. In a fruit-pricking machine, the combination of a rotatable pricking-cylinder, a yielding pressure-apron, partially encircling said cylinder, and separated therefrom, to leave an intervening space for the passage of the fruit, and means applied to said apron, to regulate the degree of its pressure upon the passing fruit.

8. In a fruit-pricking machine, the combination of a rotatable pricking-cylinder, a pressure-apron of a flexible character, partially encircling said cylinder, and separated therefrom, to leave an intervening space for the passage of the fruit, and means applied to said apron, to regulate the degree of its pressure upon the passing fruit.

9. In a fruit-pricking machine, the combination of a rotatable pricking-cylinder, a yielding pressure-apron, partially encircling said cylinder and separated therefrom, to leave an intervening space for the passage of the fruit, and weights suspended from said apron, to regulate its degree of pressure upon the passing fruit.

10. In a fruit-pricking machine, the combination of a rotatable pricking-cylinder, a yielding pressure-apron, partially encircling said cylinder, and separated therefrom, to leave an intervening space for the passage of the fruit, supports for said apron adapted to define the minimum width of said space, and weights suspended from said apron, to regulate its degree of pressure upon the passing fruit.

11. In a fruit-pricking machine, the combination of a rotatable pricking-cylinder, a yielding pressure-apron, partially encircling said cylinder, and separated therefrom, to leave an intervening space for the passage of the fruit, supports upon which the pressure-apron freely lies, and which determine the minimum width of the space between the apron and cylinder, and means applied to the apron to regulate the degree of its pressure against said supports.

12. In a fruit-pricking machine, the combination of a rotatable pricking-cylinder, a yielding pressure-apron, partially encircling said cylinder, and separated therefrom, to leave an intervening space for the passage of the fruit, supports for said apron adapted to define the minimum width of said space, weights suspended from said apron, to regulate its degree of pressure upon the passing fruit, and adjustable pulleys controlling the plane of suspension of the weights.

13. In a fruit-pricking machine, the combination of a rotatable pricking-cylinder, a yielding pressure-apron, partially encircling said cylinder, and separated therefrom, to leave an intervening space for the passage of the fruit, adjustable supports for said apron to regulate the minimum width of said space, weights suspended from said apron, to regulate its degree of pressure upon the passing fruit, and adjustable pulleys controlling the plane of suspension of the weights.

In witness whereof I have hereunto set my hand.

HARVEY M. BARNGROVER.

Witnesses:
WM. M. BEGGS,
H. A. HARDINGE.